United States Patent [19]

Ludwig

[11] Patent Number: 5,810,040
[45] Date of Patent: Sep. 22, 1998

[54] CONTAINER FOR STORING LIQUIDS

[75] Inventor: Klaus Dieter Ludwig, Pfinztal, Germany

[73] Assignee: Walter Ludwig Behalter - und Stahlbau, Pfinztal, Germany

[21] Appl. No.: 610,332

[22] Filed: Mar. 4, 1996

[30] Foreign Application Priority Data

Aug. 16, 1995 [DE] Germany ................. 195 30 058.0

[51] Int. Cl.$^6$ ................................................... F16L 59/16
[52] U.S. Cl. ..................... 137/79; 137/312; 137/375; 137/557; 137/558; 137/559
[58] Field of Search ............................ 137/264, 79, 312, 137/559, 375, 557, 558, 587

[56] References Cited

U.S. PATENT DOCUMENTS

| 767,302 | 8/1904 | Malone | 137/264 |
|---|---|---|---|
| 2,233,125 | 2/1941 | Gill | 137/587 |
| 2,531,159 | 11/1950 | Rowell | 137/312 |
| 2,608,205 | 8/1952 | Proctor | 137/312 |
| 3,738,609 | 6/1973 | Divigard | 137/79 |
| 3,827,455 | 8/1974 | Lee | 137/264 |
| 4,469,129 | 9/1984 | Dixon | 137/587 |
| 4,716,926 | 1/1988 | Jacobs | 137/312 |
| 5,156,190 | 10/1992 | Staley, Jr. | 137/312 |
| 5,265,656 | 11/1993 | McGarvey | 137/312 |

FOREIGN PATENT DOCUMENTS

| 8803960 | of 0000 | Germany . |
|---|---|---|
| 8808822 | 11/1988 | WIPO . |

Primary Examiner—A. Michael Chambers
Attorney, Agent, or Firm—Antonelli, Terry, Stout & Kraus, LLP

[57] ABSTRACT

A container for storing in particular water-endangering liquids has an inner wall and an outer wall spaced therefrom. In the lower area of the container is connected a pipeline forming a lower outlet and which is formed by an inner pipe and an outer pipe surrounding it. At the inner pipe end remote from the container is positioned a shutoff fitting and the outer pipe issues into a protective casing tightly surrounding the shutoff fitting. The gaps between the two walls and between the two pipes, as well as the inner space of the protective casing are monitored for a possible leak. So that when liquid is removed its unintentional escape in the case of damage can be reliably avoided, from the shutoff fitting a further extending pipeline extends outwards in sealed manner through the protective casing. Outside the protective casing, the further extending pipeline contains at least one shutoff device, the shutoff fitting being pretensioned in its closed position and can be brought into the open position counter to the pretension by means of a control device, if at least the shutoff device is opened and no leak is detected in the monitored spaces.

16 Claims, 4 Drawing Sheets

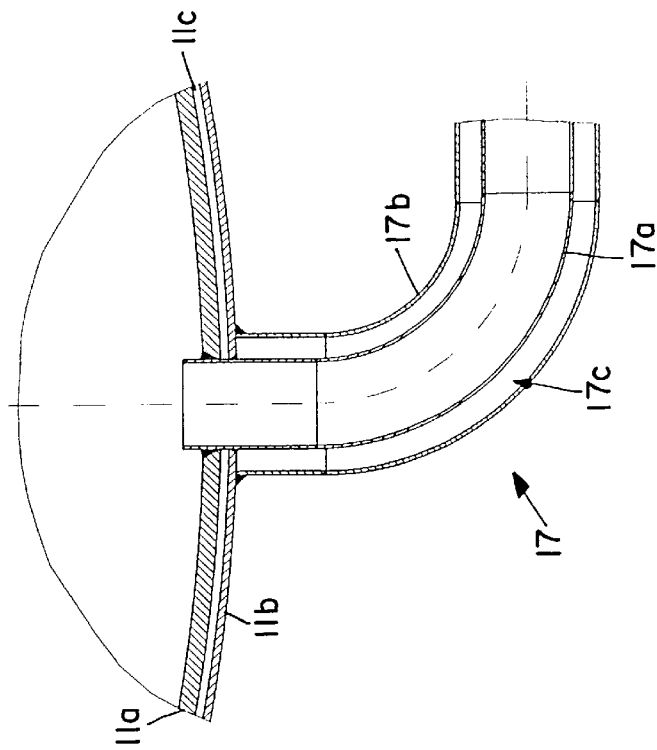
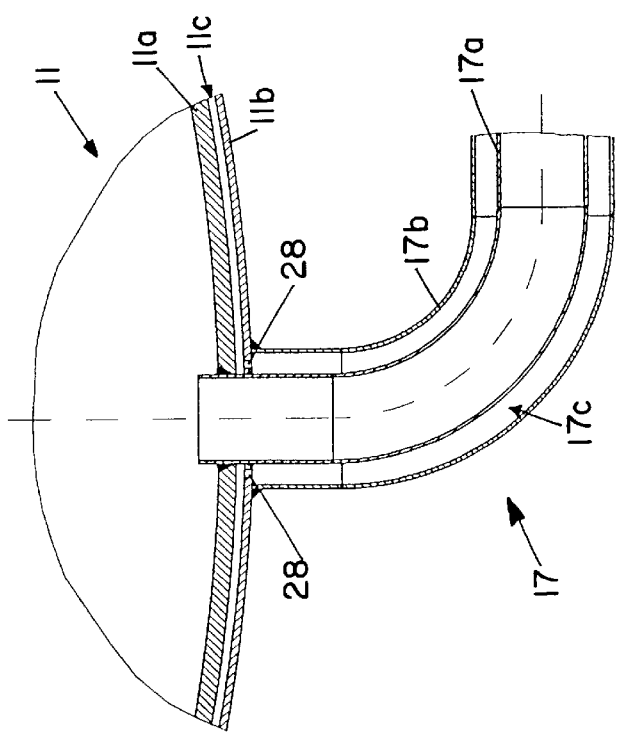

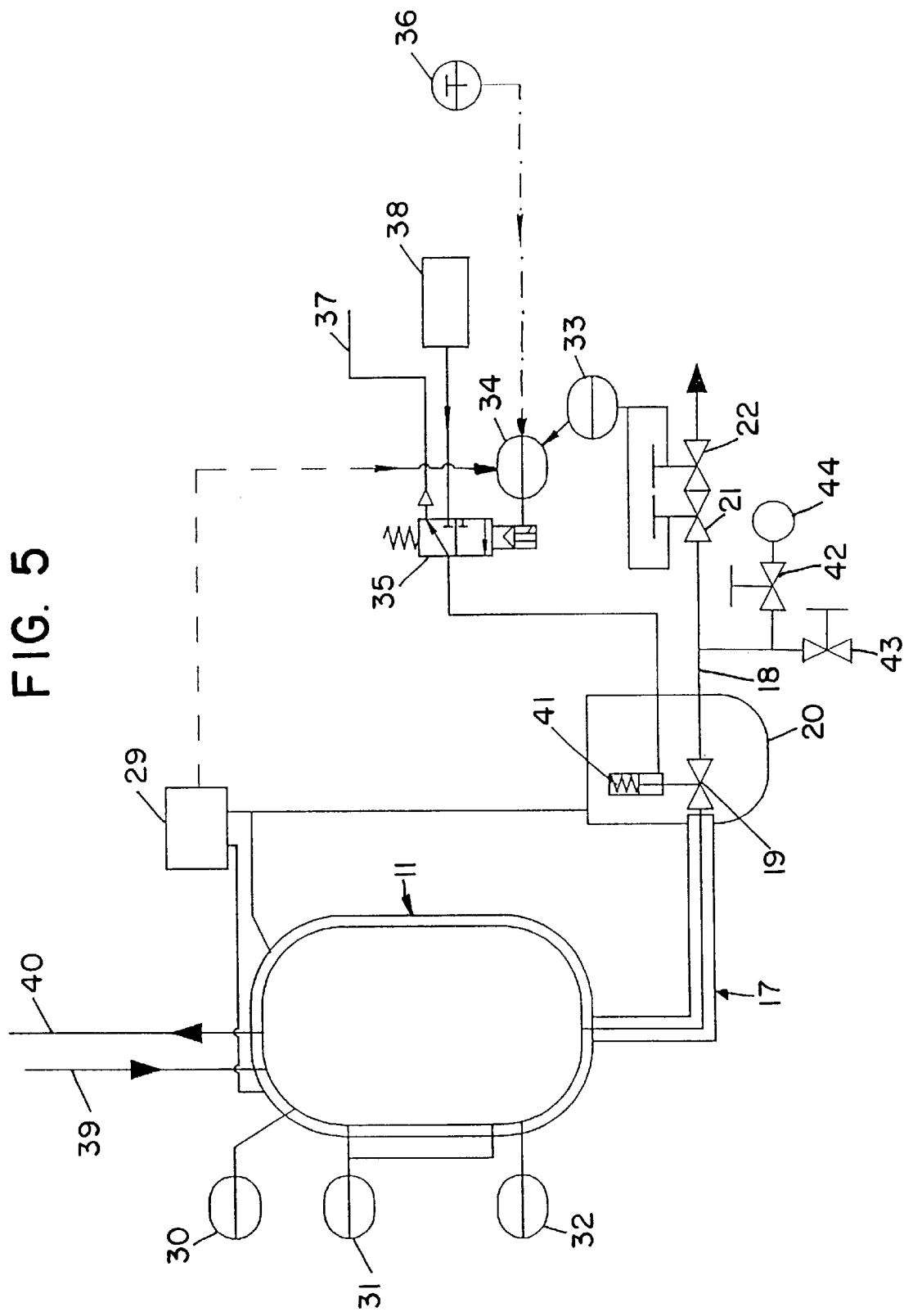

CONTAINER FOR STORING LIQUIDS

BACKGROUND OF THE INVENTION

1. Field of the Invention

The invention relates to a container for storing liquids, particularly ground water-endangering liquids, having an inner wall and an outer wall spaced therefrom and having a pipeline forming a lower outlet and which is formed by an inner pipe and an outer pipe surrounding it, a shutoff fitting being located at the end of the inner pipe remote from the container and the outer pipe extending into a protective casing tightly surrounding the shutoff fitting and in which the gap between the two walls and between the two pipes, as well as the inner space of the protective casing are monitored for leaks.

2. Description of the Prior Art

Double-Walled containers are in particular used to store aggressive liquids or liquid mixtures, which are dangerous for the environment and the ground water, so that they must be reliably prevented from escaping in an uncontrolled manner. As a result of the double-walled structure and leakage monitoring, damage to the inner wall can be detected at an early time, so that the liquid can be pumped out of the container before it passes into the environment.

It has not hitherto been acceptable for safety reasons to connect in the lower area of the container, i.e. below the filling level, an outlet-forming pipeline, because in the case of damage with such a construction there could be a substantially uncontrolled outflow of liquid. It is therefore standard practice to remove the liquid from the container by means of an upper outlet, in particular using a pump. However, this procedure is very complicated and therefore costly.

It is also known to place the complete container in a sealed tank, which in the case of damage can receive the escaping liquid. However, on the one hand such a tank is only suitable for liquids, whose vapours are harmless, and on the other the tank requires a relatively large construction space, which is not normally available.

DE 88 03 960 U1, discloses a lower connection for a double-walled container, which comprises a double-walled pipeline, whose inner pipe ends in a shutoff fitting, whereas the outer pipe widens into a protective casing surrounding fitting. At the front end the protective casing is closed by means of a fitted cover plate. In order to remove liquid from the container, the cover plate must be removed and an outlet line connected. However, in this state, in the case of damage liquid can pass out in a substantially uncontrolled manner, so that the necessary safety is not ensured.

SUMMARY OF THE INVENTION

The invention provides a container of the aforementioned type, in which, when removing the liquid by means of a lower outlet, an uncontrolled escape is reliably avoided in the case of damage.

In a container of the aforementioned type, according to the invention the problem of the prior art is solved in that a further extending pipeline passes outwards in sealed manner from the shutoff fitting through the protective casing, the further extending pipeline, outside the protective casing, containing at least one shutoff device which in a closed position the shutoff fitting is biased and can be brought into the open position counter to the bias by means of a control device, if at least the shutoff device is opened and no leak is detected in the monitored spaces.

Thus, according to the invention, even in the case of a liquid removal the protective casing is completely closed and the shutoff fitting is operated by an external control device. However, initially a check is made to establish whether the shutoff device installed in the extending pipeline, which can be a shutoff fitting having a known construction, is open. According to a preferred development of the invention this takes place in that with the shutoff device is associated a position sensor by means of which the position of the shutoff device can be detected. If the shutoff device is completely open, the position sensor supplies a corresponding position signal to the control device. When a position signal is present, i.e. the shutoff device is open, a state exists in which a removal of liquid and consequently an opening of the shutoff fitting is intended.

Moreover, according to the invention, it is first checked that in the monitored spaces, i.e. the gap between the two container walls, the gap between the two pipes of the pipeline and in the internal space of the protective casing, no leak has occurred. According to an advantageous development of the invention, the spaces are monitored by means of a leakage sensor, with which it is possible to detect a leak. The leakage sensor supplies corresponding signals to the control device giving information on the presence or absence of a leak.

Only if at least the two aforementioned conditions are fulfilled, is the shutoff fitting opened by the control device and this can take place either pneumatically or electrically.

In its normal state, the shutoff fitting is preferably pretensioned in the closed position by means of a spring and can only be opened when the above conditions are satisfied. If during the removal of liquid one of the conditions changes, as a result of its pretension the shutoff fitting automatically returns to the closed position.

According to a preferred development of the invention further conditions are provided, which must be respected so that the control device can open the shutoff fitting.

For example, a fire sensor can be provided, by means of which an excessive temperature rise in the environment of the container can be detected and a corresponding fire signal is delivered to the control device. If the control device receives a fire signal, i.e. if a fire occurs in the container environment, the shutoff fitting remains in its closed position or immediately returns thereto.

Additionally or alternatively a drive sensor can be provided, by means of which the presence of driving energy for the position movement of the shutoff fitting can be detected. If e.g. the driving energy for the shutoff fitting fails, the drive sensor supplies a corresponding signal to the control device. When an energy signal is present, the shutoff fitting remains in its closed position or returns thereto.

In order to be able to reliably drive for a long period the shutoff fitting encased in the protective casing, the connecting lines of the shutoff fitting are preferably passed in sealed manner through the protective casing wall and are made from a robust material, which can in particular withstand the liquid in the container.

It has proved advantageous to use compressed air as a drive for the shutoff fitting and between a compressed air source and the shutoff fitting is located a controllable valve, particularly a solenoid valve.

It is advantageous for safety reasons to arrange in series in the further extending pipeline two shutoff devices. Preferably the position of both shutoff devices is monitored, the shutoff fitting only being openable if both shutoff devices are open.

BRIEF DESCRIPTION OF THE DRAWINGS

Further details and features of the invention can be gathered from the following description of an embodiment with reference to the attached drawings, wherein show:

FIG. 3 A section of the connection area of the pipeline to the container according to a first embodiment.

FIG. 4 A representation corresponding to FIG. 3 of a second embodiment.

FIG. 5 A circuit diagram for the container.

DETAILED DESCRIPTION OF THE DRAWINGS

Figure 1:
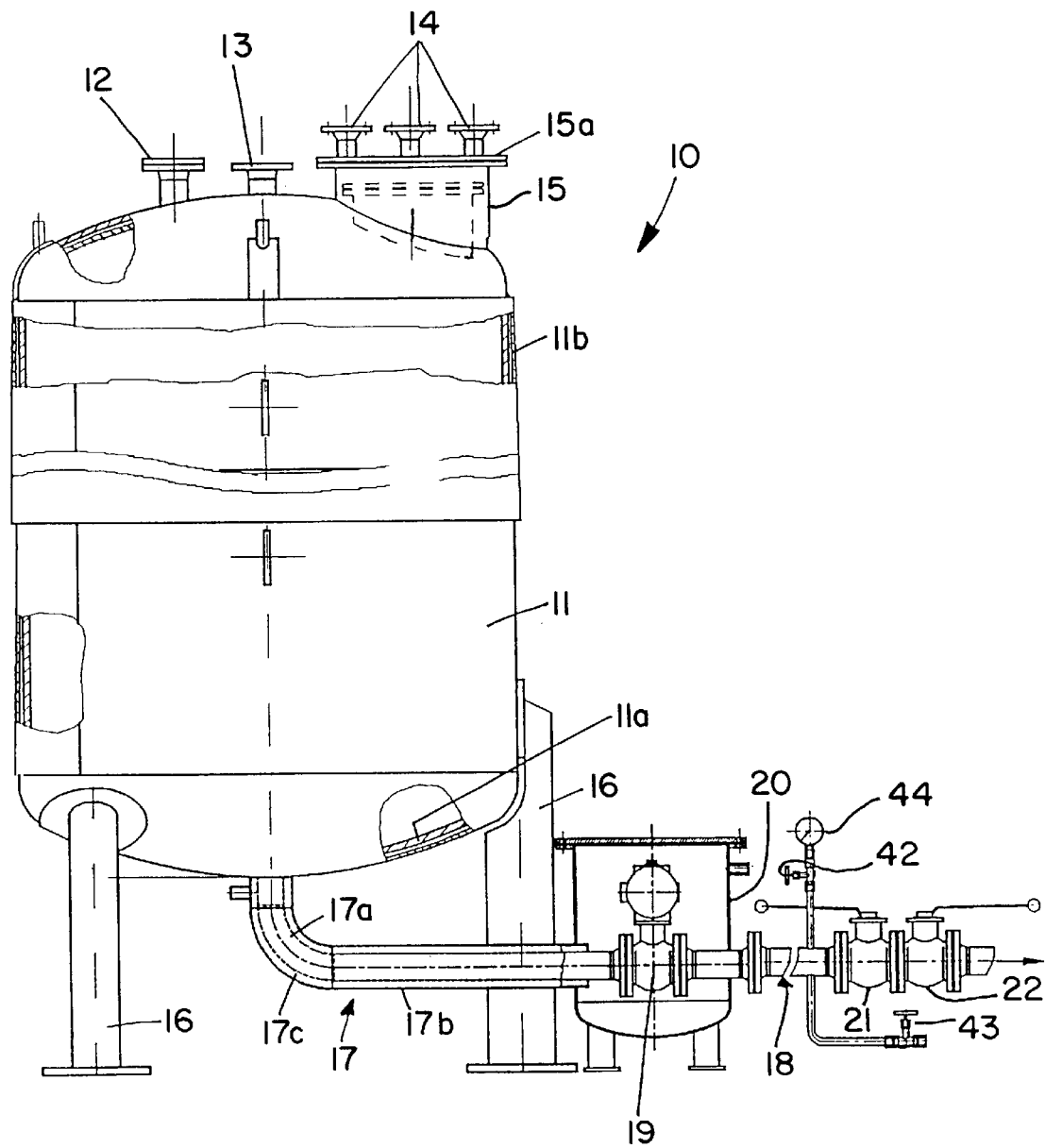
FIG. 1 A part sectionally represented side view of the container.

According to FIG. 1 a container 10 for storing in particular water-endangering liquids has a substantially closed container part 11, which is supported on the ground by means of foot structures 16. In its upper area the container part 11 has a connection 12 for a test rod, as well as a connection 13 for a ventilation system. In the upper region of the container part there is also an entrance and inspection shaft 15, which is covered in the normal state by a cover plate 15a, in which are formed several connections 14 for filling the container part.

The container part 11 has at least up to a predetermined height, which is above the maximum filling level of the container part 11, a double-walled construction constituted by an inner wall 11a and an outer wall 11b spaced therefrom. Between the inner wall 11a and the outer wall 11b is formed a gap 11c, which is in known manner leak-monitored. In the shown embodiment the container 11 is entirely double-walled.

To the lower area of the container part 11 is connected a pipeline 17, which forms a lower outlet for the container part 11 and has an inner pipe 17a and an outer pipe 17b, which surrounds the inner pipe 17a in spaced manner, so that between the two pipes 17a and 17b a gap 17c is formed, which is also leak-monitored.

On the end of the inner pipe 17a remote from the container part 11 is provided a shutoff fitting 19, to which is connected a further extending pipeline 18, which has a single-walled construction. However, alternatively, it can be double-walled. In the further extending pipeline 18 are successively provided two shutoff devices in the form of manually or motor-operable fittings 21 and 22. Upstream of the fittings 21 and 22 two shutoff fittings or valves 42 and 43 are provided in the pipeline 18, one of these shutoff fittings 42 being corrected to a pressure measuring instrument 44 like a manometer.

Figure 2:
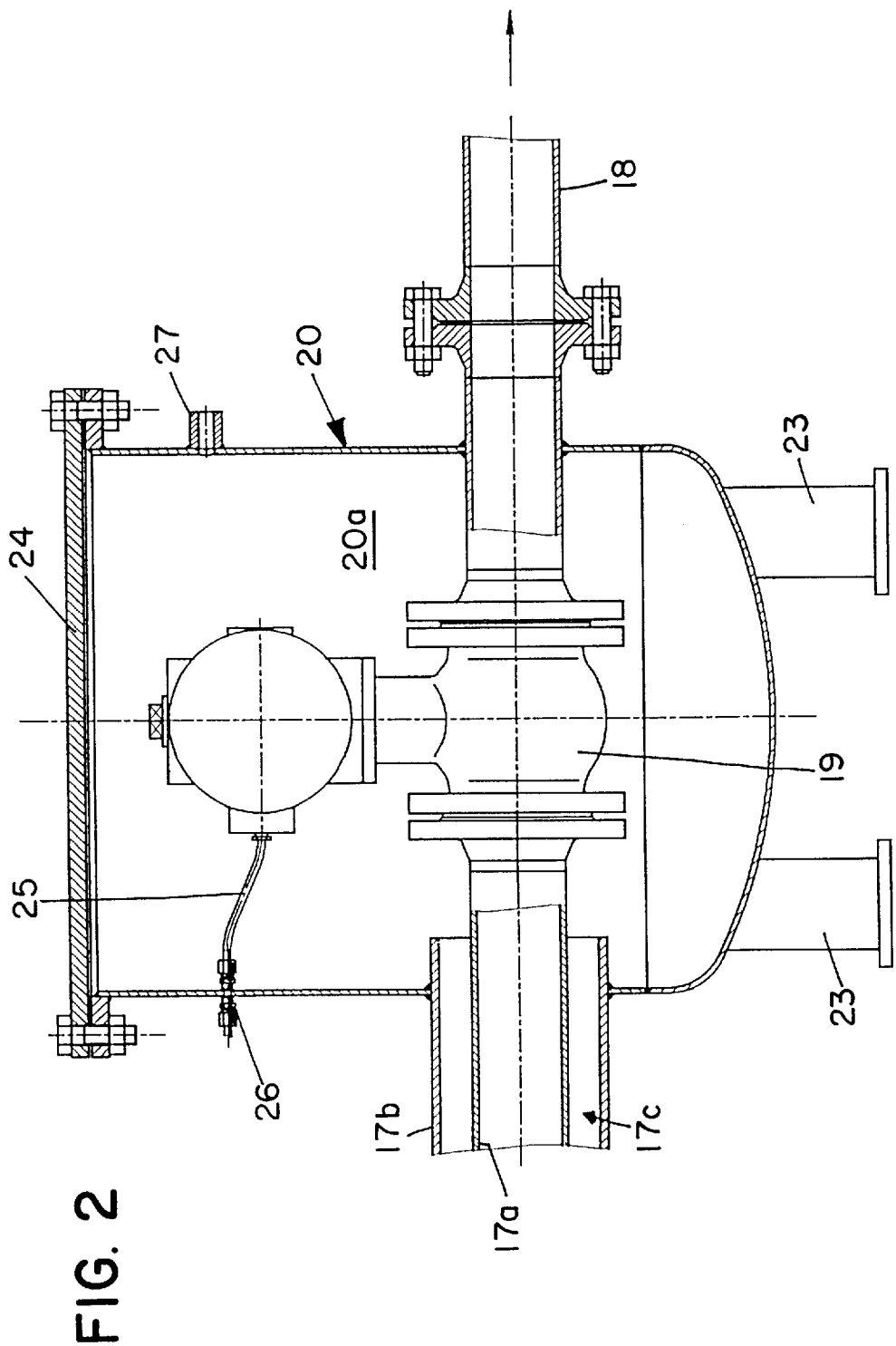
FIG. 2 A section in the vicinity of the shutoff fitting.

The shutoff fitting 19 is surrounded in liquid-tight manner by a protective casing 20, as can in particular be seen in FIG. 2. The protective casing 20 is cup-shaped and is supported on the ground by means of foot structures 23. The outer pipe 17b of the pipeline 17 passes through the wall of the protective casing 20 and is welded thereto in fluid-tight manner. In this way the outer pipe 17b issues into the protective casing 20 and its inner space 20b is connected to the gap 17c of the pipeline 17. The further extending pipeline 18 passes through the wall of the protective casing 20 in fluid-tight manner and onto the protective casing 20 is screwed a cover 24 fixed in fluid-tight manner in the normal state, so that the shutoff fitting 19 is completely encased.

In a manner not illustrated, the shutoff fitting 19 is adjustable by motor or pneumatically and from the shutoff fitting 19 connecting lines 25 pass by means of a tight, medium-resistant passage 26 through the wall of the protective casing 20, so that the shutoff fitting 19 can be connected to an external drive source.

As the inner space 20a of the protective casing 20 is connected to the inner space 17c of the pipeline 17, it is also leak-monitored. For this purpose the protective casing 20 has a socket or sleeve 27 for a leak indicator.

FIG. 3 shows the connection of the pipeline 17 to the container part 11. As can be gathered from FIG. 3 the inner pipe 17a is passed through the two walls 11a and 11b of the container part 11 and is in each case tightly welded thereto. The outer pipe 17b of the pipeline 17 is externally mounted on the outer wall 11b and is also tightly welded thereto. Close to the passage of the inner pipe 17a bores 28 are formed in the outer wall 11b of the container part 11 and link the gap 11c between the two walls 11a, 11b with the gap 17c between the two pipes 17a and 17b. This leads to the formation of a unitary leakage monitoring area, which can be monitored by a single leak indicator.

FIG. 4 shows an alternative construction in which there are no through bores 28. Thus, the gap 11c between the two walls 11a and 11b of the container part 11 is completely separated from the gap 17c between the pipe walls 17a and 17b, so that each of the two gaps must be leak-monitored.

FIG. 5 shows the circuit diagram for the container according to the invention. The container part 11 has a filling line 39 and a vent line 40 in the upper area. There are also provided an overflow preventer 30, a level indicator 31 and a temperature indicator 32 in per se known manner. The gap 11c between the two walls 11a and 11b of the container part 11 and the gap 17c between the two pipes 17a and 17b with the inner space 20a of the protective casing 20 are connected to a leak indicator 29, which supplies a corresponding leakage signal to a control device 34 if a leak occurs. The two shutoff devices 21 and 22 located in the further extending pipeline 18 have position sensors 33, e.g. end position sensors, with which it is possible to establish whether the two shutoff devices 21 and 22 are open. The position sensors 33 deliver a corresponding signal to the control device 34. In addition, a temperature sensor 36 is provided, which detects the temperature in the storage space surrounding the container, so that fires and the like can be detected. The temperature sensor 36 also supplies a corresponding signal to the control device 34.

The control device 34 is connected to a controllable valve 35, which is positioned in a connecting line between a compressed air source 38 and the shutoff fitting 19. There is also a vent line 37 by means of which the shutoff fitting 19 can be vented.

In its normal state the shutoff fitting 19 is under the action of a spring 41 keeping it in the closed position. If a user wishes to remove liquid from the container part 11a, the two shutoff devices 21 and 22 are opened, which is detected by the position sensor 33 and indicated to the control device 34. The control device 34 first checks whether there is a leak in the monitored spaces 11c, 17c and 20a and/or whether an excessive temperature exists in the storage space. If neither a leak, nor an excessive temperature are detected, the control device 34 opens the valve 35, so that compressed air can pass from the compressed air accumulator 38 via the connecting line to the shutoff fitting 19 and the latter can be opened counter to the action of the spring 41. Therefore the user can remove liquid from the container part 11. At the end of removal the user closes at least one of the shutoff devices 21 or 22, which is detected by the position sensor 33 and indicated to the control device 34, which then closes the controllable valve 35, so that due to the tension of the spring 41 the shutoff device 19 returns to its closed position.

It is optionally also possible to check prior to the opening of the shutoff fitting 19 whether adequate energy, i.e. in the present case compressed air is present for its operation. If an energy deficiency is detected, the shutoff fitting remains in the blocking position.

For checking the closeness and the operative capability in the extending pipeline 18 the pressure is checked by means of the shutoff valves 42 and 43 and the manometer 44 at predetermined time intervals.

I claim:

1. A container for storing liquids including ground water-endangering liquids comprising:

an inner wall and an outer wall spaced therefrom defining a gap, a pipeline forming a lower outlet and including an inner pipe and an outer pipe surrounding the inner pipe and defining a gap, a shutoff fitting located on the inner pipe remote from the container, the outer pipe extending into a protective casing surrounding the shutoff fitting and in which the gaps and an inner space of the protective casing are leak-monitored by a leakage indicator, a pipeline extending from the shutoff fitting outwardly in a sealed manner through the protective casing, at least one shutoff device located in the pipeline with each shutoff device including a position sensor sensing positions of the shutoff device, the shutoff fitting being biased in a closed position and being positioned in an open position against the bias in response to a control device when a position sensor detects an open position of the at least one shutoff device and the leakage indicator indicates no leak in the gaps or the inner space.

2. A container according to claim 1, wherein:

the position sensor supplies a signal to the control device indicating a position thereof.

3. A container according to claim 2, wherein:

the leakage indicator supplies a leak signal to the control device indicating when a leak occurs into the gaps or the inner space.

4. A container according to claim 2, wherein:

the shutoff fitting is biased by means of a spring.

5. A container according to claim 2, wherein:

the shutoff fitting is either pneumatically or electrically operable and connecting lines of the shutoff fitting pass in a sealed manner through the protective casing.

6. A container according to claim 2, wherein:

the control device includes a controllable valve.

7. A container according to claim 2, wherein:

two shutoff devices are successively positioned in the pipeline outside the protective casing.

8. A container according to claim 1, wherein:

the leakage indicator supplies a leak signal to the control device indicating when a leak occurs into the gaps or the inner space.

9. A container according to claim 1, further comprising:

a temperature sensor for detecting an excessive temperature rise in an environment of the container and supplying a signal to the control device for indicating a fire.

10. A container according to claim 9, wherein:

the shutoff fitting is positioned in a closed position when a signal indicating fire is present.

11. A container according to claim 1, further comprising:

a drive sensor for detecting presence of stored energy for positioning movement of the shutoff fitting and producing an energy signal to the control device when stored energy failure occurs.

12. A container according to claim 11, wherein:

the shutoff fitting is positioned in a closed position when a stored energy signal is present.

13. A container according to claim 1, wherein:

the shutoff fitting is biased by means of a spring.

14. A container according to claim 1, wherein:

the shutoff fitting is either pneumatically or electrically operable and connecting lines of the shutoff fitting pass in a sealed manner through the protective casing.

15. A container according to claim 1, wherein:

the control device includes a controllable valve.

16. A container according to claim 1, wherein:

two shutoff devices are successively positioned in the pipeline outside the protective casing.

* * * * *